(12) United States Patent
Miklos et al.

(10) Patent No.: US 6,991,748 B2
(45) Date of Patent: Jan. 31, 2006

(54) PROCESS FOR THE PRODUCTION OF A SHIELDING GAS MIXTURE

(75) Inventors: Ernst Miklos, Tutzing (DE); Burkhard Haas, Unterschleissheim (DE)

(73) Assignee: Linde Aktiengesellschaft, Wiesbaden (DE)

( * ) Notice: Subject to any disclaimer, the term of this patent is extended or adjusted under 35 U.S.C. 154(b) by 328 days.

(21) Appl. No.: 10/323,855

(22) Filed: Dec. 20, 2002

(65) Prior Publication Data

US 2003/0234385 A1  Dec. 25, 2003

(30) Foreign Application Priority Data

Dec. 20, 2001  (DE) ................................ 101 62 938

(51) Int. Cl.
*C09K 3/00* (2006.01)
*B23K 35/38* (2006.01)

(52) U.S. Cl. ........................................ 252/372; 219/74
(58) Field of Classification Search ................ 252/372; 219/74, 137 R
See application file for complete search history.

(56) References Cited

U.S. PATENT DOCUMENTS

| | | | |
|---|---|---|---|
| 3,526,740 A | | 9/1970 | Brinkmann et al. |
| 4,292,493 A | * | 9/1981 | Selander et al. ............... 219/74 |
| 5,210,389 A | | 5/1993 | Farwer |
| 5,271,869 A | * | 12/1993 | Nicoud et al. ............... 252/372 |
| 5,349,152 A | * | 9/1994 | Renner ......................... 219/99 |
| 5,367,137 A | | 11/1994 | Hammarlund et al. |
| 5,396,039 A | * | 3/1995 | Chevrel et al. ................ 219/61 |
| 5,558,791 A | * | 9/1996 | Fawer ................ 219/137 WM |
| 6,069,336 A | * | 5/2000 | Borne et al. ................... 219/75 |
| 6,564,990 B2 | * | 5/2003 | Nagashima et al. ......... 228/219 |
| 6,596,971 B1 | * | 7/2003 | Biskup et al. ...... 219/137 WM |
| 2001/0006229 A1 | * | 7/2001 | Wakum et al. ............... 252/372 |

FOREIGN PATENT DOCUMENTS

| | | | |
|---|---|---|---|
| CH | 634 498 | 2/1983 | |
| DE | 4225981 | * 2/1994 | ................. 252/372 |
| EP | 0 020 174 | 12/1980 | |
| EP | 0020174 A1 | 12/1980 | |
| EP | 0544187 A1 | 6/1993 | |
| EP | 1 101 599 A1 | 11/2000 | |
| FR | 2646496 A1 | 11/1990 | |
| WO | 91/13720 | 9/1991 | |

* cited by examiner

*Primary Examiner*—Wayne A. Langel
(74) *Attorney, Agent, or Firm*—Millen, White, Zelano, Braningan, P.C.

(57) ABSTRACT

In a process for the production of a shielding gas mixture argon is withdrawn from a liquid argon supply, vaporized and mixed with a gas premix. The gas premix contains helium and/or argon and a doping gas. A shielding gas mixture prepared this way is outstandingly suited, especially because of the helium content, for arc welding of aluminum and aluminum alloys.

15 Claims, No Drawings

PROCESS FOR THE PRODUCTION OF A SHIELDING GAS MIXTURE

The invention relates to a process for the production of a shielding gas mixture for arc joining, specifically arc welding, containing argon and at least one other gas as the doping gas in the range of 0.001 to 0.7% by volume (10 to 7000 vpm), and the argon is produced by vaporization from the liquid phase. The invention further relates to a gas premix for the production of this shielding gas mixture.

Arc joining encompasses arc welding, which has been known for a long time, as well as brazing with an arc under shielding gas, which has recently been gaining in importance. The joining of heterogeneous materials also belongs to arc joining, where one material is melted completely while the other is only warmed up.

In arc welding under shielding gas, inert gasses represent the overwhelming portion of the shielding gas. The inert gas used most often in shielding gas welding is argon. The addition of helium to the argon improves the heat balance of the shielding gas in the arc and in the melt, which produces, depending on the material, deeper fusion penetration, better degassing, and better wetting. In this way, higher welding speeds are achieved with helium. Besides argon, mixtures of argon and helium are used, above all, when welding aluminum and aluminum alloys.

In welding or brazing materials using inert gasses, process disturbances often occur. They are caused by arc instabilities. To eliminate this drawback, small amounts of active gasses are added to the inert gases, i.e., the gasses are doped. Doping is performed in the range of less than one percent (vpm range). For example, doping of inert gasses with $CO_2$, $O_2$, NO and $N_2$ for welding aluminum materials is well known. EP 544 187 describes doping of a shielding welding gas with $CO_2$ or $O_2$ for use with nickel-based materials. Doping with $CO_2$ or $O_2$ for arc brazing is also known and described in EP 1 101 559. The addition of a doping gas improves not only arc stability but also provides the seam with a high quality appearance and prevents oxidation of the workpiece.

Patent CH 634 498 mentions various nitrogen compounds for doping. Here, the addition of NO to argon or to a mixture of argon and helium has proven useful. Such shielding gasses lead to an excellent appearance of the welding seam and prevent oxidation of the workpiece and welding spatter on the workpiece.

To be able to use an optimal shielding gas mixture for welding, it must be available in a sufficiently large amount in the welding device. Normally, a shielding gas mixture is premixed with several components at the gas supplier and delivered in gas bottles to the gas user. The gas user can then use the finished gas mixture without further work steps. In this case, it is advantageous to have a low concentration of doping gas in the shielding gas mixture—in case of NO toxins—but the large amounts of gas that must be delivered to the gas user are a drawback. With high gas consumption, this is done at great expense. Since the volume of the argon is reduced by one multiple during liquefaction, large amounts of gas are normally delivered in liquid form and stored. The necessary amounts of gas are withdrawn in the form of a vaporized liquid. Thus, large consumers generally have liquid argon delivery. For the large user, finished gas mixtures—especially compared to a liquid argon supply—are consequently difficult to manage.

Another possibility for the gas user to obtain the desired shielding gas mixture is to mix it on location. If the gas user needs mixtures in which each of the components is present at a volume portion of at least one percent, commercially available blending components can be used. But, gas mixtures with volume portions less than one percentage point, which include doped shielding gas mixtures, cannot be produced with commercially available mixers. Thus, the production of doped shielding gas mixtures is expensive to do for the gas user. A drawback of all on-location mixing technology is above all the fact that the gas user must sometimes work with toxic NO—a great potential danger.

EP 0 020 174 describes a process for mixing gasses with differing thermal conductivity. With this process it is possible to produce a doped shielding gas mixture. The mixing technology described in it also makes it possible precisely to prepare volume portions of only a few percentage points in one mixture.

WO91/13720 shows another way to prepare an NO-doped shielding gas mixture that exploits the volume reduction of argon when it is liquefied. In this process, NO is dissolved in liquid argon and then this solution is vaporized by the gas consumer.

But, the production of doped shielding gas mixtures has not been satisfactorily designed, from a technical and practical point of view. In particular, there is no simple or uncomplicated process that combines the advantages arising from the use of a liquid argon supply with the advantages derived from the addition of a doping gas. But, the important thing is not only a practical production process for shielding gas mixtures but also an appropriate composition of the gas portions of the shielding gas mixture, since the shielding gas mixture is decisive in determining the quality of the weld or the brazing joint.

Thus, an object of the invention is to provide a process that makes it possible to use a liquid argon supply in producing a doped shielding gas mixture. In particular, this invention makes it possible to produce doped shielding gas mixtures with a helium component. A further object of the invention is further to prepare a gas premix that is suitable for producing such a shielding gas mixture.

Upon further study of the specification and appended claims, further objects and advantages of this invention will become apparent to those skilled in the art.

These objects are achieved with respect to the process in that argon prepared by vaporization is mixed with a gas premix that contains, in addition to helium and/or argon, the doping gas at a concentration of 0.005 to 1.0% by volume (50 to 10,000 vpm), preferably up to 0.8% by volume (8000 vpm). Since in this process according to the invention the argon, which represents the major portion of the shielding gas mixture and thus is needed in a very large amount, is withdrawn from the liquid argon supply and vaporized, all advantages offered by liquid argon supply can be exploited. The gaseous argon is then mixed with the gas premix.

Since the gas premix consists of helium mixed with doping gas, the correct doping gas concentration in the range of 10 to 7000 vpm (0.001 to 0.7% by volume) will be set up when the helium portion reaches the required size. With an available liquid argon supply, the gas consumer now needs only a mixer to obtain an optimal shielding welding gas mixture. A commercially available two-component mixer is completely sufficient for this purpose. The mixing ratios that must be set for the process according to the invention are in the percent range and are thus easily able to be set up with commercially available mixers. The shielding gas mixture produced according to the process of the invention is optimal for arc welding since the doping gas assures a good seam appearance and prevents oxidation, while the helium effects good fusion penetration, good degassing, and good wetting.

Advantageously the shielding gas mixture produced by mixing contains helium in an amount between 5 and 70% by volume. Preferably the helium content is between 10 and 50% by volume, especially preferably between 15 and 30% by volume. Because of this helium content, the shielding gas mixture is outstandingly suited for arc welding and arc brazing of aluminum and aluminum alloys as well as of nickel-based alloys.

In an advantageous embodiment of the invention, a gas or a mixture of the gasses NO, $N_2$, $O_2$, or $CO_2$ is used as the doping gas. These doping gasses guarantee not only an optimal appearance of the welding seams and the brazing connections and that unacceptable oxidation is avoided, but also an improvement of the arc stability.

Especially advantageously, NO at a concentration of 0.005 to 0.1% by volume (50 to 1000 vpm) is used as the doping gas. Because of the relatively high helium content that the shielding gas mixture according to the invention exhibits, such a low NO concentration is also possible in the gas premix. According to technical rules (AdR), concentrations higher than 2.3% NO are considered toxic and corrosive; a value to which the gas premix according to the invention does not even come close. In this advantageous embodiment, the gas premix contains at most 1000 vpm (0.1% by volume) of NO, since then the labeling duty that is required according to the noxious substance regulation for NO concentrations pertaining to the streets beyond 1000 vpm of NO is dropped. Since then the gas premix, even if toxic NO is used, does not fall under the noxious substance regulation, working with the gas premix is not a problem and even mixing the gas premix with the vaporized argon is easy to do.

In accordance with the inventor the gas premix contains, in addition to helium and/or argon, the doping gas at a concentration of 0.005 to 1.0% by volume (50 to 10,000 vpm), preferably up to 0.8% by volume (8000 vpm). Using the gas premix according to the invention the shielding gas mixture contains the doping gas(es) as well as the admixed doped helium/argon/helium-argon mixture at a volume that is optimal for welding and brazing. The gas premix is ideally adjusted for the shielding gas mixture to be mixed.

In an advantageous embodiment, the gas premix contains, as a doping gas, a gas or a mixture of the gasses NO, $N_2$, $O_2$, or $CO_2$.

Especially advantageously the gas premix contains—if doped with NO—at most 1000 vpm (0.1% by volume) of NO. At this value, the maximum NO content of the gas premix is limited to an amount that is so small that labeling according to the noxious substance regulation pertaining to the streets is not necessary. The maximum concentration of the doping gas is limited to the value beyond which the labeling duty applies. Consequently the gas premix according to the invention is still rated as safe according to the applicable noxious substance regulation pertaining to the streets. Thus no special precautions are to be taken for the delivery and use of the gas premix. According to other embodiments, the gas premix preferably contains at most 1000 vpm of $N_2$, $O_2$, or $CO_2$.

Preferably, the gas premix preferably contains up to almost 100 vol. % helium (e.g., the premix gas consists of only helium and the dopant). For example, the gas premix can contain 50 to 100 vol. % helium (minus the vol. % attributed to the dopant), especially 70–100 vol. % According to another embodiment, the gas premix contains argon, helium and the dopant, e.g., the gas consists of argon, helium and the doapnt.

The invention will be described in more detail below based on three examples that differ in the helium content and in the amount of the doping gas. Various gas premixes according to the invention were used to produce them.

In the foregoing and in the following examples, all temperatures are set forth uncorrected in degrees Celsius; and, unless otherwise indicated, all parts and percentages are by volume.

The entire disclosure of all applications, patents and publications, cited above and below, and of corresponding German Application No. 101 62 938.9, filed Dec. 20, 2001 is hereby incorporated by reference.

EXAMPLES

In example 1, a shielding gas mixture that contains argon and helium in an amount of 30% by volume and, as the doping gas, 270 vpm (0.03% by volume) of NO is produced. To do this, the gas consumer withdraws argon from the liquid argon supply and vaporizes it. The gaseous argon is now mixed in a commercially available mixer with a gas premix. The gas premix contains helium doped with 900 vpm (0.09% by volume) of NO and was mixed to its finished form by the gas supplier and delivered in individual or bundled bottles to the gas consumer. The shielding gas mixture that is now available to the gas consumer for welding is outstandingly suited, because of the doping gas and the helium content, for welding aluminum and aluminum alloys.

In example 2, a shielding gas mixture consisting of argon, helium and 300 vpm (0.03% by volume) of $O_2$ is produced. To do this, the gas consumer withdraws argon from the liquid argon supply and vaporizes it. The gaseous argon is now mixed in a commercially available two-component mixer with a gas premix that contains helium doped with 2,000 vpm (0.2% by volume) of $O_2$. The gas premix was mixed by the gas supplier and delivered in gas bottles to the gas consumer. The shielding gas mixture with 300 vpm (0.03% by volume) of $O_2$ obtained this way contains 15% by volume of helium and argon in the remaining volume. It is outstandingly suited for making heterogeneous joints between aluminum and steel sheets. A shielding gas mixture that was produced according to this variant of the process according to the invention is, from a cost viewpoint and with massive consumption, considerably easier to use compared with a delivery of the corresponding finished mix.

The production of a shielding gas mixture of argon, helium with an amount of 50% by volume and 500 vpm (0.05% by volume) of $CO_2$ as the doping agent is now explained in more detail in example 3. The gas premix here contains helium doped with 1000 vpm (0.1% by volume) of $CO_2$ and was mixed in finished form by the gas supplier and delivered in individual or bundled bottles to the gas consumer. Argon is withdrawn from the liquid argon supply of the gas consumer, vaporized and mixed in a commercially available two-component mixer with the gas premix. The shielding gas mixture now contains 500 vpm of $CO_2$, 50% helium and argon in the remaining volume and shows its advantages especially in metal shielding gas welding of nickel-based alloys. With the production process, this shielding gas mixture can be made available very economically in large amounts and thus the advantages can be exploited also by clients who use a lot of it.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for production of a shielding gas mixture for arc joining comprising argon and at least one other gas as the doping gas in the range of 0.001–0.7% by volume, said process comprising vaporizing argon from a liquid phase consisting of argon, mixing the vaporized argon with a gas premix that contains helium and/or argon and contains the doping gas at a concentration of 0.005–1% by volume.

2. A process according to claim 1, wherein said gas premix contains the doping gas at a concentration of 0.005–0.8% by volume.

3. A process according to claim 1, wherein the shielding gas mixture obtained by mixing contains helium in an amount of 5–70% by volume.

4. A process according to claim 3, wherein the shielding gas mixture contains helium in an amount of 10–50% by volume.

5. A process according to claim 3, wherein the shielding gas mixture contains helium in an amount of 15–30% by volume.

6. A process according to claim 1, wherein NO, $N_2$, $O_2$, $CO_2$ or any combination thereof is used as the doping gas.

7. A process according to claim 2, wherein NO, $N_2$, $O_2$, $CO_2$ or any combination thereof is used as the doping gas.

8. A process according to claim 3, wherein NO, $N_2$, $O_2$, $CO_2$ or any combination thereof is used as the doping gas.

9. A process according to claim 1, wherein NO at a concentration of 0.005 to 0.1% by volume (50 to 1000 vpm) is used as the doping gas.

10. A process according to claim 2, wherein NO at a concentration of 0.005 to 0.1% by volume (50 to 1000 vpm) is used as the doping gas.

11. A process according to claim 3, wherein NO at a concentration of 0.005 to 0.1% by volume (50 to 1000 vpm) is used as the doping gas.

12. A process according to claim 1, wherein said doping gas comprises NO.

13. A process according to claim 1, wherein said doping gas comprises $N_2$.

14. A process according to claim 1, wherein said doping gas comprises $O_2$.

15. A process according to claim 1, wherein said doping gas comprises $CO_2$.

* * * * *